Sept. 27, 1966 L. HALL 3,274,740
MOTOR VEHICLE WINDOW
Filed June 3, 1964 6 Sheets-Sheet 1

LESLIE HALL
Inventor

By John R. Faulkner
John J. Laethel
Attorneys

LESLIE HALL
Inventor

Sept. 27, 1966  L. HALL  3,274,740
MOTOR VEHICLE WINDOW
Filed June 3, 1964  6 Sheets-Sheet 3

LESLIE HALL
Inventor

By John R. Faulkner
John J. Roethel
Attorneys

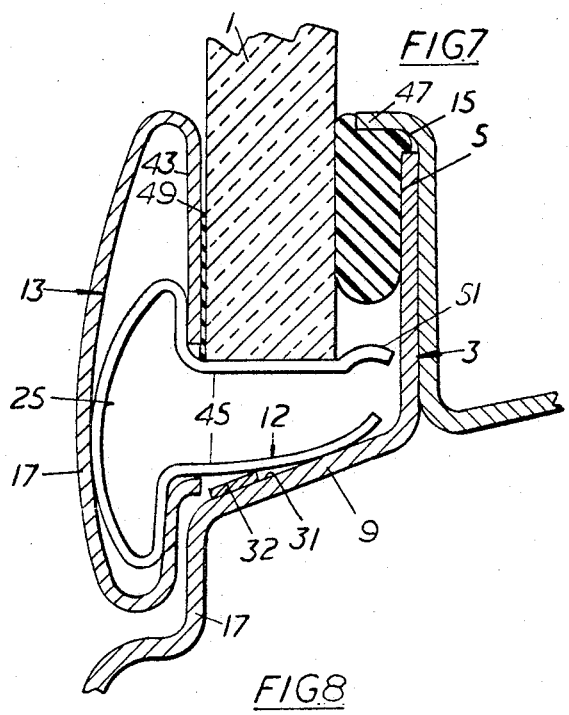
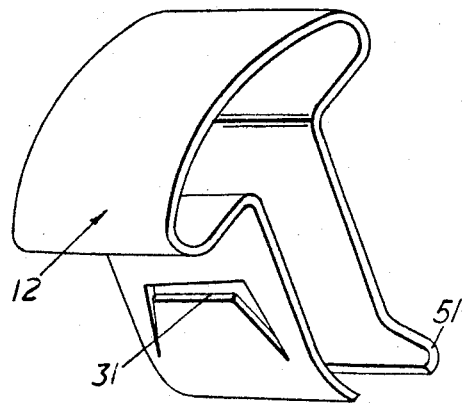
LESLIE HALL
Inventor

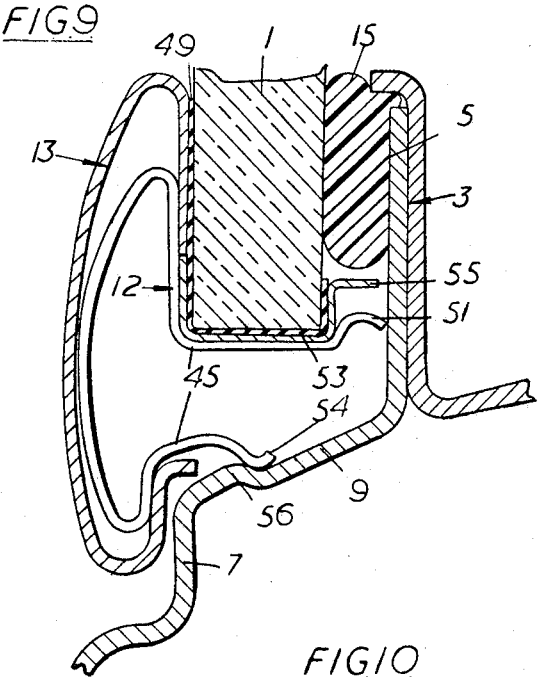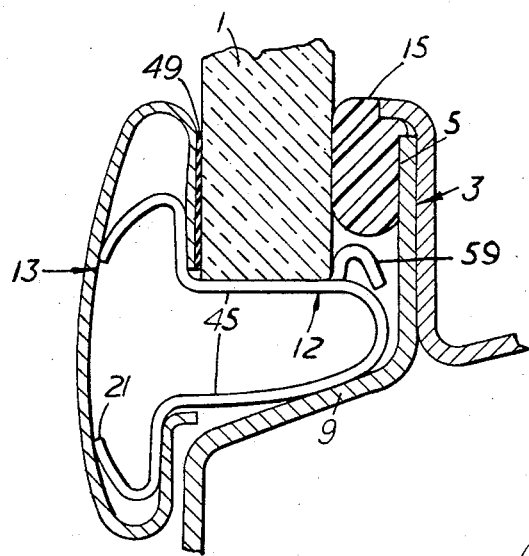

Sept. 27, 1966            L. HALL            3,274,740
MOTOR VEHICLE WINDOW
Filed June 3, 1964            6 Sheets-Sheet 6
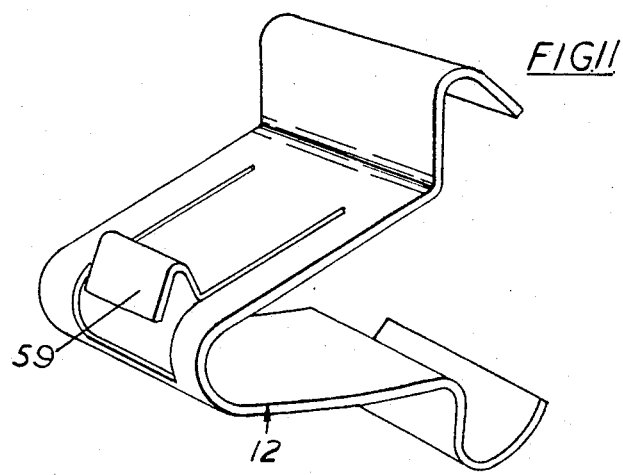
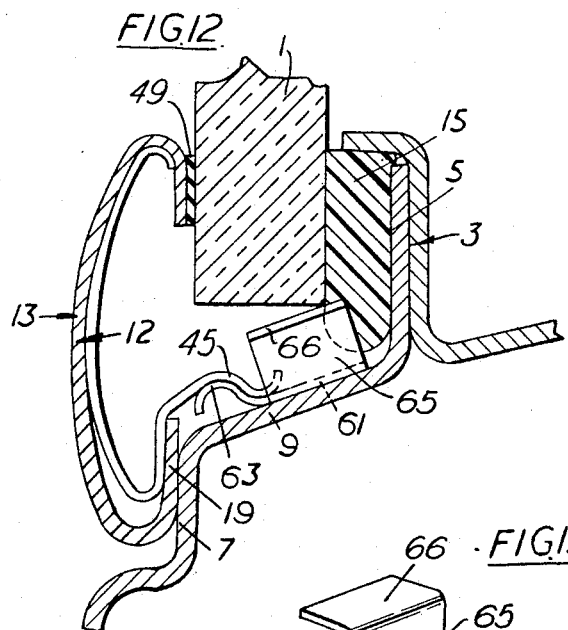
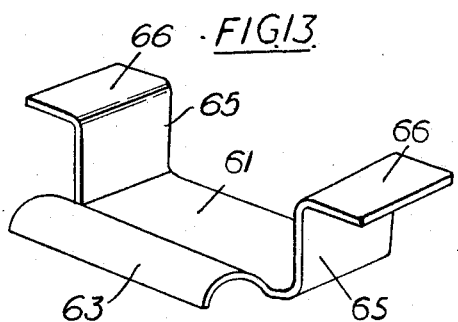
LESLIE HALL
Inventor
By John R. Faulkner
John J. Coethel
Attorneys

United States Patent Office 3,274,740
Patented Sept. 27, 1966

3,274,740
MOTOR VEHICLE WINDOW
Leslie Hall, Northfield, Birmingham, England, assignor to Ford Motor Company, Dearborn, Mich., a corporation of Delaware
Filed June 3, 1964, Ser. No. 372,279
8 Claims. (Cl. 52—208)

This invention relates to motor vehicle windows.

The glass of most vehicle windows is held in position by rubber weatherstrips which also hold decorative metallic or non-metallic mouldings in position.

Recently however, the glass has been bonded to the window frames, and this has presented problems in attaching the decorative mouldings to the windows.

In a motor vehicle window according to the present invention the glass is bonded, for example by a polysulphide rubber adhesive, to the window frames; and a decorative moulding is attached to the frame around the window aperture by a plurality of spring clips in resilient engagement with the frame. Preferably, each spring clip is in resilient engagement with a shoulder on the window frame vertically spaced from the edge of the glass.

The clips may be removably attached to the frame by resilient engagement with the frame and the glass on a member in which the glass fits, or the clips may be bonded to the frame by adhesive so that they are not removable from the frame. The moulding may be attached to the frame by the clips alone so that it is removable from the frame, or by a combination of the clips and adhesive so that it is not removable from the frame.

The invention is hereinafter particularly described with reference to the accompanying drawings in which:

FIG. 7 is a section through part of another window assembly;

FIG. 8 is a perspective view of a component of the window assembly shown in FIG. 7;

FIG. 9 is a section through another window assembly;

FIG. 10 is a section through another window assembly;

FIG. 11 is a perspective view of a component of the window assembly shown in FIG. 10;

FIG. 12 is a section through another window assembly;

FIG. 13 is a perspective view of a component of the window assembly shown in FIG. 12.

Figure 1:
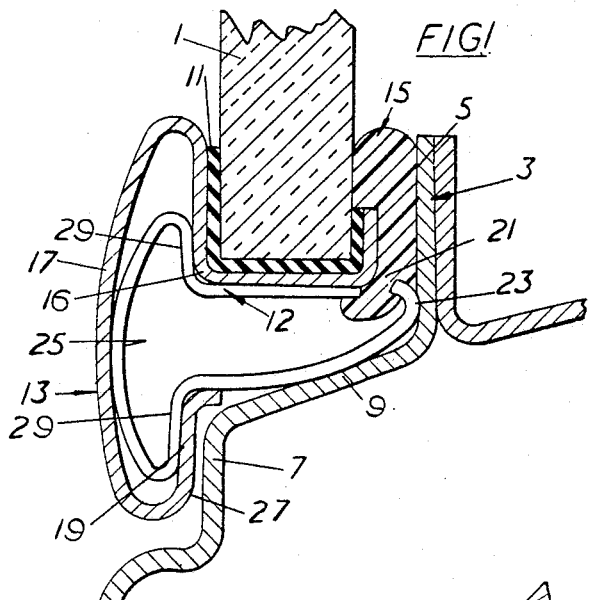
FIG. 1 is a section through part of a motor vehicle window assembly.

The window shown in FIG. 1 comprises a glass 1, a frame 3 having an attachment surface or flange 5 and shoulders 7 and 9, a channel member 11 which is made of anti-squeak material and in which the glass 1 fits, spring clips 12 (only one is shown), a resilient metallic decorative moulding 13, and adhesive 15.

The adhesive 15 bonds the glass 1 to the surface 5 of the frame. The decorative moulding 13 has a channel shaped part 16 in which the member 11 is seated, a convex decorative portion 17, and an outer flange 19. Each spring clip 12, which is closed on three sides and has an open gap 21 adjacent the attachment surface 5, is compressed between the part 16 and the shoulder 9. A curved end portion 23 of one leg of the clip engages the surface 5, while the bight 25 engages the portion 17 of the moulding 13.

The clips 12 prevent the glass 1 being moved perpendicular to its plane towards the surface 5 by virtue of the engagement of the end portions 23 with the surface 5 and prevent it being moved in its own plane towards the shoulder 9 during curing or setting of the adhesive 15. The gap 27 between the outer flange 19 and the shoulder 7 allows for manufacturing tolerances. The ends of the clips 12 are embedded in the adhesive 15, and are consequently fixed. The flanges 29 on each clip, together with the adhesive 15, hold the moulding in position.

Figure 2:
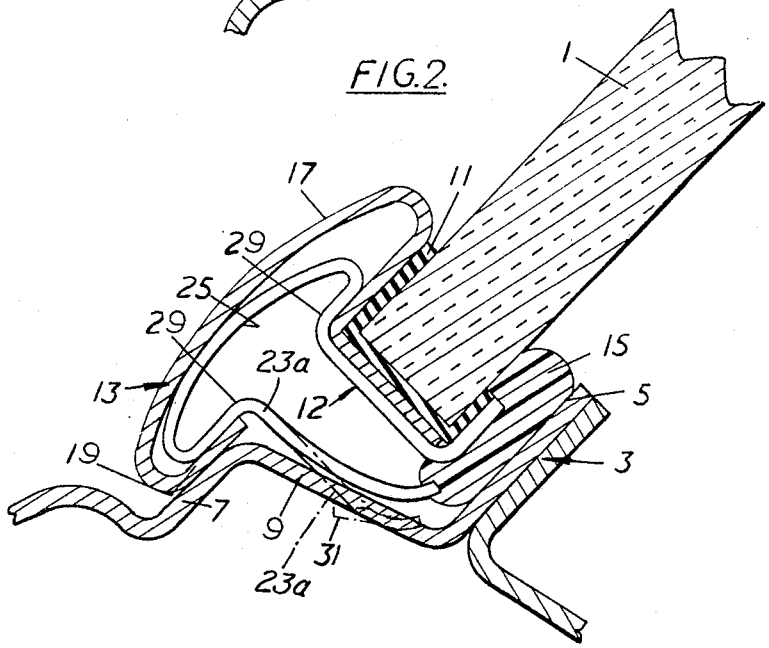
FIG. 2 is a section through part of another motor vehicle window assembly.
Figure 3:
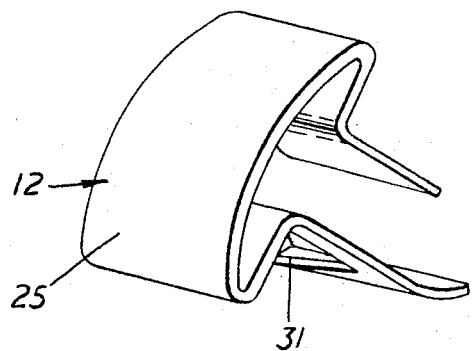
FIG. 3 is a perspective view of a component of the window assembly shown in FIG. 2.

The window assembly shown in FIG. 2 and the clip shown in FIG. 3 are substantially the same as the ones shown in FIG. 1, and the same reference numerals are used as far as possible. In the window assembly of FIG. 2, however, the clip 12 has a leg portion 23a having a barb 31 projecting downwardly therefrom. The barb 31 is adapted to engage the opposed surface of the shoulder 9 thereby causing the leg portion 23a to flex from its phantom line 3 position to the solid line position in which it resiliently resists dislodgement of the barb 31 from the surface of shoulder 9.

Figure 4:
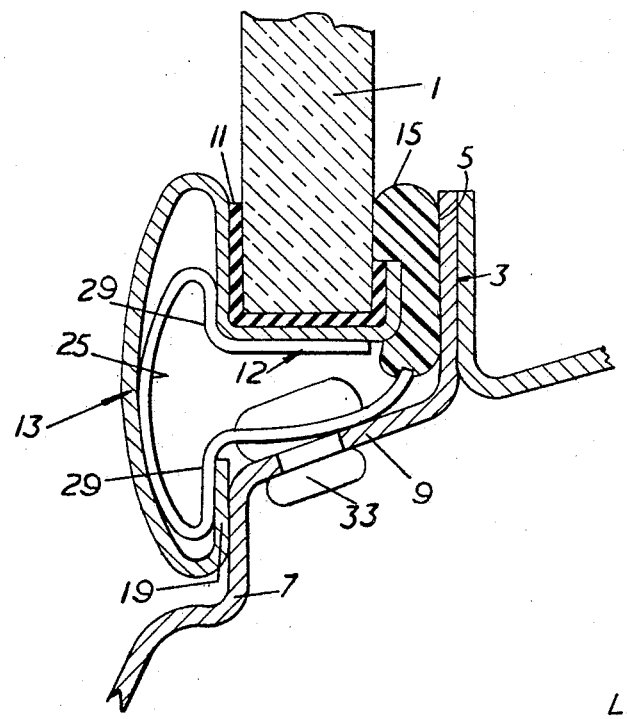
FIG. 4 is a section through part of another window assembly.
Figure 5:
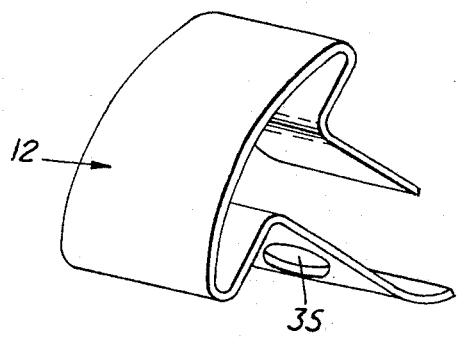
FIG. 5 is a perspective view of a component of the window assembly shown in FIG. 4.

The window assembly shown in FIG. 4 and the clip shown in FIG. 5 are more or less the same as the ones shown in FIGS. 2 and 3, respectively, and the same reference numerals are used where possible. Instead of the barb 31, the shoulder 9 of the window frame has a projection in the form of a rivet 33 which fits in an aperture 35 in the clip 12. The rivet 33 and aperture 35 are so arranged that insertion of the rivet into the aperture bends the outer flange 29 of the clip, and so clamps the outer flange 19 of the moulding between the clip flange 29 and the shoulder 7.

In the window assemblies shown in FIGS 1, 2 and 4, the decorative mouldings 13 are not removable from the window after the glass has been bonded to the attachment surface 5 since part of each is embedded in the adhesive 15. In addition the clips 12 are not removable since a part of each is also embedded in the adhesive 15.

Figure 6:
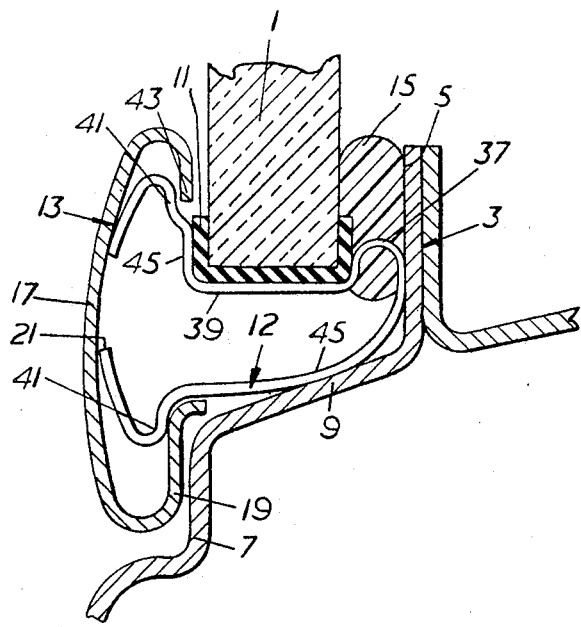
FIG. 6 is a section through part of another window assembly.

In the window assembly shown in FIG. 6 the decorative moulding 13 is removable from the window after the adhesive has set. So far as possible the same reference numerals are used as in the previous figures. The decorative moulding 13, unlike the mouldings in the previous figures, does not have a channel-shaped section 16. The gap 21 in the spring clip 12 is not adjacent the attachment surface but opposite the decorative portion 17 of the moulding, and the clip has a looped portion 37 embedded in the adhesive 15, a channel-shaped section 39 in which the anti-squeak channel 11 fits, and shoulders 41 which are engaged by the outer flange 19 and inner flange 43 of the moulding. The moulding is removable from the clip by pulling it away from the plane of the window, and this forces the arms 45 of the clip together so that the shoulders 41 move clear of the ends of the flanges 19 and 43. The looped portion 37 engages the surface 5 while the lower arm 45 engages the shoulder 9, and this locates the glass in the desired position whilst the adhesive is setting.

Referring now to FIGS. 7 and 8, in this embodiment the clip 12 as well as the moulding 13 is removable from the frame. The attachment surface 5 is lengthened and has an outwardly turned flange 47 which restricts spread of the adhesive 15 over the glass 1. The channel 11 made of anti-squeak material is omitted and instead a strip 49 of anti-squeak material is interposed between the inner moulding flange 43 and the glass. The moulding 13 itself is of the same shape as the moulding in FIG. 6. The clip 12 is, however, substantially the same as the clip 12 shown in FIG. 2. Since the attachment surface 5 is lengthened, no part of the clip 12 is embedded in adhesive 15, and this permits removal of the clip. The clip 12, and with it the decorative moulding 13, is removable by forcing the moulding upwardly to disengage the barb 31 from a strip of metal 32 fixed to the shoulder 9, and then pulling the moulding away from the glass. This forces the arms 45 of the clip together so that the upwardly turned part 51 of the upper arm clears the corner of the glass 1.

In the window assembly shown in FIG. 9 the clip 12 is not embedded in adhesive 15; and a channel-shaped member 53, which fits around the end of the glass 1, has an inwardly directed flange 55 which restricts spread of the adhesive on to the curved end portion 51 of the clip. The end portion 51 engages the attachment surface 5 to limit movement of the clip towards the surface 5, while the lower arm 45 has no barb 31 but instead has a loop 54 which engages a groove 56 in the shoulder 9. The strip of anti-squeak material 49 is extended around the end of the glass 1, and is clamped between the channel-shaped member 53 and the glass 1. The clip and moulding assembly may be removed by pulling the moulding away from the glass to force the arms 45 of the clip together to clear the channel member 45 and edge of the groove 56.

The clip 12 in the window assembly shown with reference to FIGS. 10 and 11 is somewhat similar to the clip shown in FIG. 6. No part of the clip, however, is embedded in adhesive, and the clip has an outwardly extending shoulder 59 which engages the inner surface of the glass 1 to hold the clip and moulding in position. The strip 49 of anti-squeak material is similar to that in FIGURE 7. The assembly of clip and moulding is removable by pulling the moulding away from the glass; this forces the shoulder 59 inwardly to permit withdrawal of the clip.

In the window assembly shown with reference to FIGS. 12 and 13, the clip 12 is held in position by engagement with the frame 3. A bracket 61 is welded to the shoulder 9, and has a sprung upwardly curved portion 63 which is engaged by a correspondingly curved portion on the lower arm 45 of the clip 12 to prevent removal of the clip and to hold the lower flange 19 of the moulding against the shoulder 7. The bracket 61 has side walls 65 between which the clip fits and which prevent sliding of the clip along the shoulder 9 towards an adjacent clip. The side walls have out-turned parts 66 which engage the glass to limit movement of the glass in its own plane during setting of the adhesive. The assembly of clip and moulding is removable by pulling the moulding away from the glass 1; this bends the portion 63 downwardly and the lower arm upwardly to permit removal of the clip.

It will be understood that the invention is not to be limited to the exact construction shown and described, but that various changes and modifications may be made without departing from the spirit and scope of the invention, as defined in the appended claims.

I claim:
1. A motor vehicle window assembly comprising a glass panel;
   a window frame defining a glass panel receiving aperture,
   said frame including a shoulder vertically spaced from an edge of said panel,
   said shoulder terminating in a flange in parallel spaced relationship to a marginal area of one face of said panel;
   adhesive means interposed between said marginal area and said flange bonding said panel to said window frame;
   at least one spring clip interposed between said panel edge and said shoulder,
   said spring clip having at least one resilient leg portion in engagement with said frame shoulder;
   a decorative moulding,
   and coacting means on said spring clip and said decorative moulding retaining the latter in spring clip concealment position against the other face of said panel.

2. A motor vehicle window assembly according to claim 1 in which the coacting means on said spring clip and said decorative moulding include portions embedded within said adhesive means.

3. A motor vehicle window assembly according to claim 1 in which said spring clip has a resilient leg terminating in a portion embedded in said adhesive means,
   and in which the coacting means on said spring clip and said decorative moulding removably retain the latter in spring clip concealment position.

4. A motor vehicle window assembly according to claim 1 in which the clip has a barb in engagement with the frame to inhibit removal of the clip in a direction normal to the plane of the glass away from the frame.

5. A motor vehicle window assembly according to claim 1 in which the spring clip is provided with a flange between which and a shoulder on said frame the decorative moulding is clamped,
   said clip flange and said last mentioned shoulder restricting inward movement of the clip towards the frame aperture.

6. A motor vehicle window assembly comprising a glass panel;
   a window frame encompassing said panel comprising a first shoulder extending in substantially coplanar relationship to a first face of said panel, and
   a second shoulder inclined relative to said first shoulder and in spaced relationship to an edge of said panel,
   said second shoulder terminating in a flange overlapping the marginal area of a second face of said panel with a space therebetween,
   adhesive means filling the space between said second face and said flange bonding said panel to said window frame;
   spring clip means interposed between said edge of said panel and said second shoulder,
   said spring clip means having spaced leg portions one of which is in engagement with said second shoulder and the other of which is contiguous to said edge of the panel,
   said leg portions being under compression to inhibit movement of said panel in its own plane.

7. A motor vehicle window assembly according to claim 6 in which a decorative moulding conceals said spring clip means,
   said spring clip means and said decorative moulding having coacting means thereon retaining said decorative moulding against the first face of said panel.

8. A motor vehicle window assembly comprising a glass panel;
   a window frame encompassing said panel comprising a first shoulder extending in substantially coplanar relationship to a face of said panel, and
   a second shoulder inclined relative to said first shoulder in spaced relationship to an edge of said panel,
   said second shoulder terminating in a flange overlapping the marginal area of a second face of said panel with a space therebetween,
   adhesive means filling the space between said second face and said flange bonding said panel to said window frame;
   and spring clip means having spaced members positioned between the space between said edge of the panel and said second shoulder,
   one member of said spring clip means being in engagement with said second shoulder and the other member being contiguous to said edge of the panel,
   said members being flexed toward each other to resist movement of said panel in its own plane.

(References on following page)

References Cited by the Examiner

UNITED STATES PATENTS

| | | | |
|---|---|---|---|
| 2,556,775 | 6/1951 | Oswald | 52—400 X |
| 2,671,541 | 3/1954 | Kramer | 52—494 X |
| 2,793,071 | 5/1957 | Meyer | 189—78 X |
| 2,976,972 | 3/1961 | Raymond | 52—717 |
| 3,155,204 | 11/1964 | Campbell et al. | 189—77 |

FOREIGN PATENTS

| | | |
|---|---|---|
| 864,343 | 1/1953 | Germany. |
| 678,819 | 9/1952 | Great Britain. |

HARRISON R. MOSELEY, *Primary Examiner.*

W. E. HEATON, *Assistant Examiner.*